United States Patent [19]
Lyons et al.

[11] Patent Number: 5,910,892
[45] Date of Patent: Jun. 8, 1999

[54] HIGH POWER MOTOR DRIVE CONVERTER SYSTEM AND MODULATION CONTROL

[75] Inventors: James Patrick Lyons, Niskayuna; Vlatko Vlatkovic, Schenectady, both of N.Y.; Paul Martin Espelage, Salem, Va.; Albert Andreas Maria Esser, Delafield, Wis.

[73] Assignee: General Electric Company, Schenectady, N.Y.

[21] Appl. No.: 09/108,041

[22] Filed: Jun. 30, 1998

Related U.S. Application Data

[60] Provisional application No. 60/063,223, Oct. 23, 1997.
[51] Int. Cl.$^6$ .................................................. H02M 7/5387
[52] U.S. Cl. ............................................. 363/98; 363/132
[58] Field of Search ................................ 363/17, 41, 43, 363/97, 98, 131, 132

[56] References Cited

U.S. PATENT DOCUMENTS

| | | | |
|---|---|---|---|
| 4,270,163 | 5/1981 | Baker | 363/43 |
| 4,855,893 | 8/1989 | Kratz | 363/136 |
| 5,060,129 | 10/1991 | Maruyama | 363/41 |
| 5,274,542 | 12/1993 | Tanaka et al. | 363/96 |
| 5,355,297 | 10/1994 | Kawabata et al. | 363/43 |
| 5,506,765 | 4/1996 | Nakata et al. | 363/98 |
| 5,621,628 | 4/1997 | Miyazaki et al. | 363/37 |
| 5,638,266 | 6/1997 | Horie et al. | 363/132 |
| 5,684,688 | 11/1997 | Rouaud et al. | 363/132 |

*Primary Examiner*—Adolf Deneke Berhane
*Attorney, Agent, or Firm*—Ann M. Agosti; Marvin Snyder

[57] ABSTRACT

A high power motor drive converter includes a three level neutral point clamped (NPC) output power conversion stage including switches; a split series connected DC capacitor bank coupled in parallel with the NPC output power conversion stage; and a controller for selecting switch positions for controlling the NPC output power conversion stage and controlling a neutral voltage balance of the DC capacitor bank by using space vector modulation and predictive charge calculations.

23 Claims, 9 Drawing Sheets

5,910,892

HIGH POWER MOTOR DRIVE CONVERTER SYSTEM AND MODULATION CONTROL

This application claims benefit of provisional application Ser. No. 60/063,223 filed Oct. 23, 1997.

BACKGROUND OF THE INVENTION

The present invention relates generally to modulation control for high power converters and more particularly to determining gate timings for power electronic switches in three phase power converters used in motor drive systems.

Baker et al., U.S. Pat. No. 4,270,163, proposed a three level inverter power circuit in a neutral point clamped (NPC) bridge inverter but did not provide a mechanism for neutral capacitor balance or a viable modulation technique for a vector controlled drive, both of which are necessary for using the power circuits in motor drive systems.

Various suggestions have been made to address the issues of how to use these proposed power circuits in motor drive systems. For example, Kratz, U.S. Pat. No. 4,855,893, describes a method of providing neutral voltage balance in which a twelve pulse rectifier source converter supplies independent stiff grid support of each half of the DC capacitor bank and in which switching safety of power devices is improved with a snubber design. This embodiment eliminates active control for capacitor voltage balancing and simplifies the controller requirements, but unfortunately cannot achieve the five percent total demand distortion (TDD) on the grid connect required by the IEEE-519 standard set by the institute of Electrical and Electronics Engineers (IEEE).

Early modulators were defined as sine-triangle hardware schemes or with off-line optimized switching patterns. More modern NPC modulator approaches based on space vector synthesis techniques have been developed using algorithms focusing on gate turn off (GTO) converters where large minimum gating time constraints (greater than 100 microseconds) are a dominant consideration. Active neutral voltage control was first described using sine-triangle modulation schemes with zero-sequence voltage insertion for voltage balance control. The zero sequence reference voltage was developed from capacitor voltage unbalance and power flow direction (motoring or regeneration). The space vector modulator synthesis algorithms were also modified to exploit redundant vector states in order to control the neutral voltage balance. Several space vector methods have included sub-dividing the vector space to avoid minimal pulse timing constraints of GTO switching elements by simultaneously controlling capacitor neutral voltage while minimizing switching frequency.

The power flow based neutral voltage balance control systems of the above techniques can have problems maintaining neutral control in high dynamic conditions.

SUMMARY OF THE INVENTION

It is therefore seen to be desirable to provide a quick response high power motor drive converter system. It would be particularly useful to provide a system for operation in the 1–20 MW power range capable of supplying an alternating current (AC) drive motor with medium voltage output 2.3–6.6 KV at fundamental output frequencies up into the 100–200 Hz range.

In one embodiment of the present invention, a quick response high power motor drive converter system includes: a three level neutral point clamped output power conversion stage connected to an AC drive motor, a split series connected DC capacitor bank, a controller for computing switch timings via space vector modulation with active controlled neutral voltage balance using a predictive charge calculation method, and either a non-regenerative diode rectifier source converter bridge or a second regenerative three level neutral point clamped input power conversion stage configured as a pulse width modulating (PWM) source converter.

In this embodiment, the three level power converter both minimizes voltage steps applied to the drive motor (reducing winding stresses) and enables medium voltage outputs using commercially available switching devices (IGBT (insulated gate bipolar transistor), GTO, or IGCT (integrated gate commutated thyristor)). Faster switching IGBTs or IGCTs additionally allow for greater flexibility and some algorithm simplification as compared with GTO converters.

The modulator control of the three level inverter is used to determine the gate timings for the power electronic switches in the three phase power converter. The converter, in general, produces sinusoidal currents by a pulse width modulation (PWMA) process in order to achieve smooth control over load voltage. The converter modulation control must be capable of operating as the actuation stage in a vector controlled induction or synchronous motor control and thus be able to create an arbitrary output voltage vector at each control sampling instant in response to transient torque events. The modulation control is preferably software based to minimize any specialized hardware requirements.

This embodiment will support a variety of options including the addition of actively controlling dynamic braking resistive elements in the non-regenerative configuration. Further options include the addition of snubber circuits on the inner switch elements and/or the outer switch elements. Another modification includes the addition of a neutral-ground reference network tuned to provide damping for reflected wavefronts propagating on the motor cables.

BRIEF DESCRIPTION OF THE DRAWINGS

The features of the invention believed to be novel are set forth with particularity in the appended claims. The invention itself, however, both as to organization and method of operation, together with further objects and advantages thereof, may best be understood by reference to the following description taken in conjunction with the accompanying drawings, where like numerals represent like components, in which:

DETAILED DESCRIPTION OF A PREFERRED EMBODIMENT OF THE INVENTION

Figure 1:
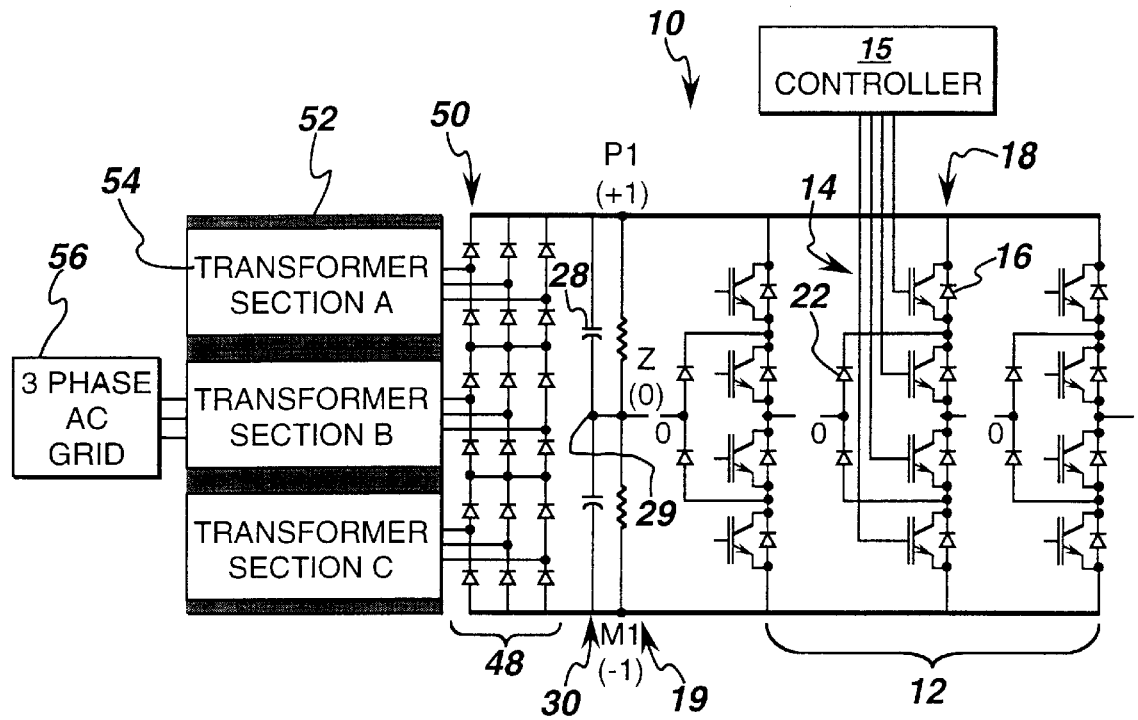
FIG. 1 is a circuit diagram of a non-regenerative converter with low grid current distortion and active neutral charge balance control.
Figure 2:
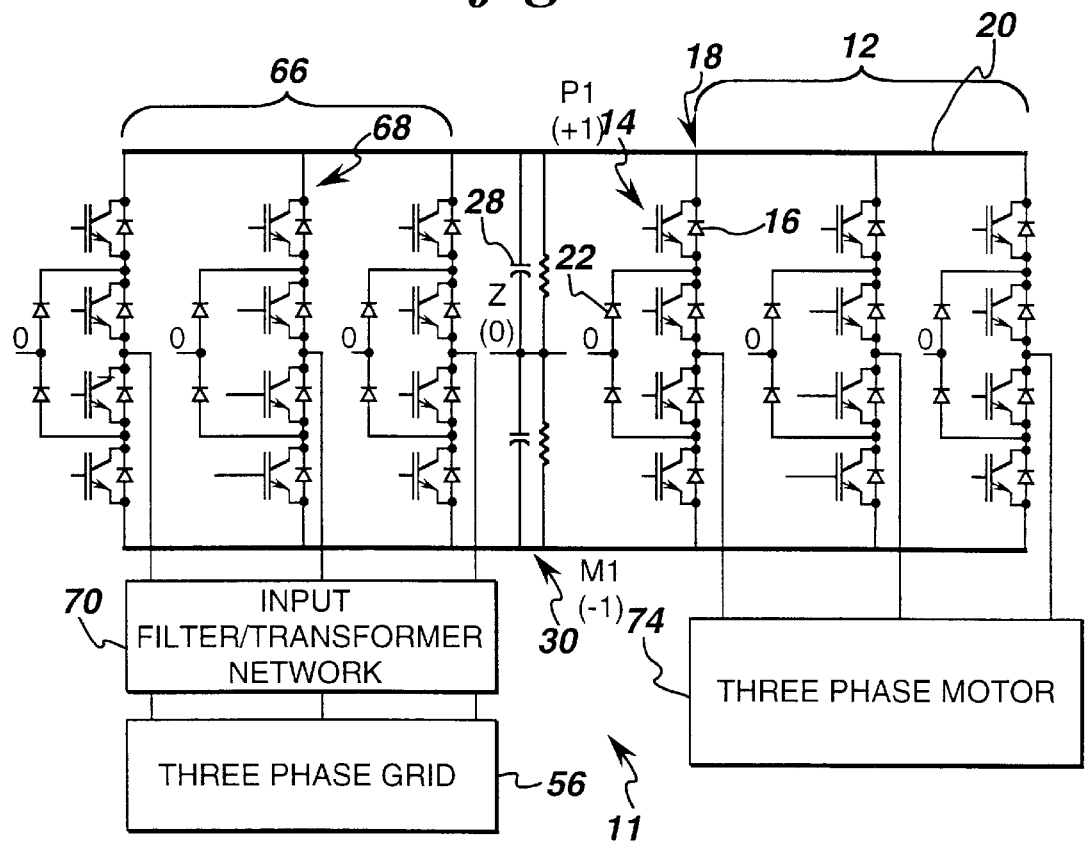
FIG. 2 is a circuit diagram of a regenerative converter embodiment.

FIG. 1 is a circuit diagram of a non-regenerative converter 10 with low grid current distortion and active neutral charge balance control, and FIG. 2 is a circuit diagram of a regenerative converter 11. Both embodiments include a three level output power conversion stage 12. The output power stage includes electrical switches 14 which are shown as IGBTs (Insulated Gate Bipolar Transistors). Other useful switches include GTOs (Gate Turn Off Thyristors) and IGCTs (Integrated Gate Commutated Thyristors). The switches are paired with anti-parallel freewheeling diodes 16 to accommodate the inductive motor load currents. A controller 15, shown in FIG. 1, is used for controlling each of the switches. The controller comprises a computer and in a preferred embodiment includes a digital signal processor.

Figure 3:
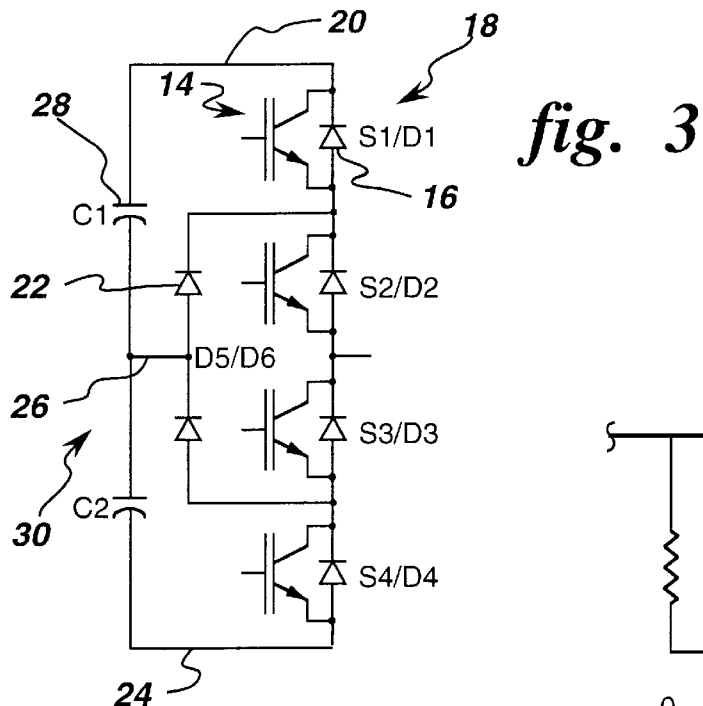
FIG. 3 is a circuit diagram of a NPC three level phase leg.

FIG. 3 is a circuit diagram of an individual NPC three level phase leg 18 of FIG. 1 and FIG. 2. The three phase inverter has four switch and diode pairs spanning the DC bus (with a positive rail labeled P-Bus 20, a negative rail labeled N-Bus 24, and a midpoint of the bus labeled midpoint 26) and two clamping diodes 22 (labeled D5, D6). The switch diode pairs are labeled top to bottom S1/D1, S2/D2, S3/D3, S4/D4. As shown in Table 1, there are three command states for the switches per phase.

TABLE 1

| NPC States | | | | | |
|---|---|---|---|---|---|
| STATE 1 (+) | S1 ON | S2 ON | S3 OFF | S4 OFF | LOAD PT @ P-BUS |
| STATE 2 (0) | S1 OFF | S2 ON | S3 ON | S4 OFF | LOAD PT @ MID-POINT |
| STATE 3 (−) | S1 OFF | S2 OFF | S3 ON | 54 ON | LOAD PT @ N-BUS |

Depending on the switch commanded state per phase, and the instantaneous polarity of the load current in that phase, the load current path can be through switches, freewheeling diodes, or clamping diodes. For example, if the commanded state is STATE 2, and the load current is positive, the load current path is through clamp diode D5 and switch S2. If the commanded state is STATE 2, and the load current is negative, the load current path is through switch S3 and clamp diode D6.

Table 1 shows the load terminal per phase can be either at P-bus, N-bus, or DC bus midpoint, which gives rise to the terminology three level or neutral point clamped inverter. In a two level inverter, the load terminal per phase is either at P-bus or N-bus. This extra load point level, that is, the DC midpoint, in the three level inverter accounts for its lower load current harmonic amplitudes than a two level inverter chopping at the same frequency.

The second advantage of the three level inverter is that with four switches spanning the DC bus, each with a maximum working DC voltage equal to one half the DC link voltage, twice the output voltage for a given switch voltage rating can be obtained compared to a two level inverter. This is achieved without the need to gate the switches directly in series and thus turn-on, turn-off voltage sharing complications are avoided.

The capacitor 28 bank 30 midpoint (at DC midpoint 26) and the clamping diodes 22 connected between capacitor bank midpoint and switches S1/S2 and S3/S4 respectively keep the maximum DC working voltage across any switch from exceeding one half of the DC bus voltage (Vdc/2), provided the DC filter capacitor midpoint voltage is maintained at Vdc/2. Regulators are built into the modulator to keep the midpoint voltage at Vdc/2 to guard against long term unequal discharge of the two capacitor bank halves. The resistor network 19 (shown in FIGS. 1 and 2) across the DC bus capacitor bank serves as a fixed safety bleed resistor and a balance network for initial capacitor charging.

Figure 4:
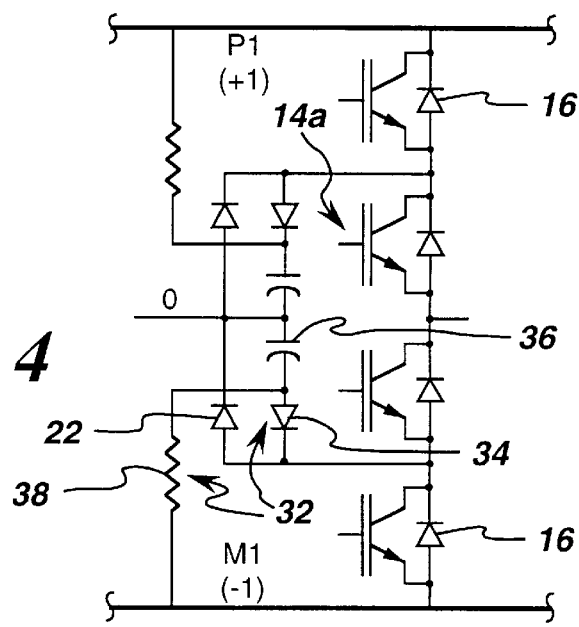
FIG. 4 is a circuit diagram of snubber circuits applied to inner switch elements of the NPC phase leg of FIG. 3.

FIG. 4 is a circuit diagram of optional snubber circuits 32 applied to inner switches 14a of the NPC phase leg of FIG. 3. A snubber diode 34 will turn on during switch turn-off whenever the voltage across the device exceeds the positive portion 20 of the bus, effectively placing the snubber capacitor 36 in parallel with switch 14a. The capacitor will transiently absorb the excess energy stored in the parasitic circuit inductances in series with the switch. After the switch is turned off, the ringup voltage across the snubber capacitor is dissipated in the snubber resistor 38. The snubber elements are sized to keep the switching trajectory of voltage and current within the a safe operating area. If IGBT switches are used, an inverter will typically be constructed with low inductance circuit paths and buswork so that at low current levels the phase leg can be safely switched. The inner switches 14a (S2 & S3) commutate current between higher inductance circuit paths as compared to outer switches 14b (S1 & S4) with current switching through four device elements rather than two device elements. Consequently, the inner switches will experience greater voltage overrings and can require snubbers.

Figure 5:
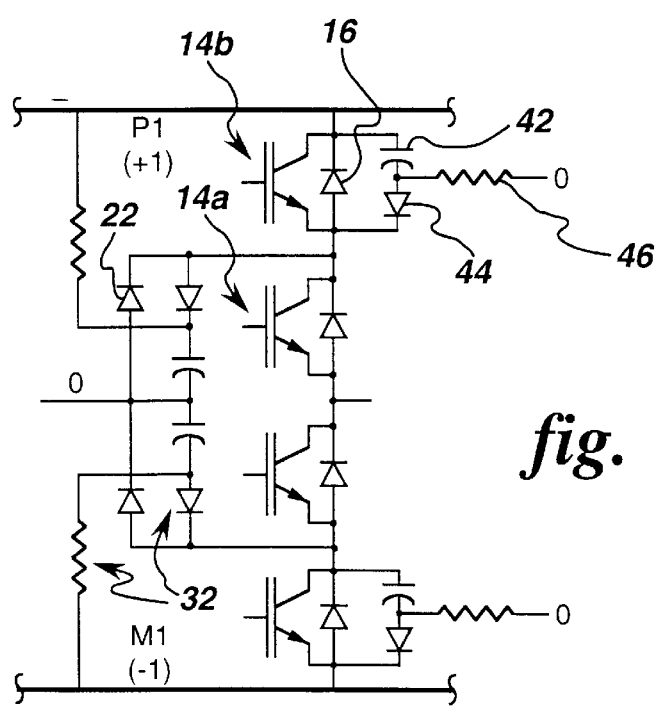
FIG. 5 is a circuit diagram of snubber circuits applied to outer switch elements of the NPC phase leg of FIG. 3.

FIG. 5 is a circuit diagram of optional snubber circuits applied to outer switches of the NPC phase leg of FIG. 4. The illustrated outer switch snubbers also act to clamp the overring across the switch to half the DC bus during device turnoff. Snubber diode 42, snubber capacitor 44, and snubber resistor 46 of FIG. 5 operate on the outer switches in the same manner as snubber diode 34, snubber capacitor 36, and snubber resistor 38 of FIG. 4 operate on the inner switches.

Low harmonic distortion of grid current is important for the IEEE-519 standard which requires a measurable objective of less than five percent total demand distortion at the grid connection. Either a non-regenerative or a regenerative circuit can be used, based on the specific drive application, to meet this standard.

The non-regenerative variant of this invention illustrated in FIG. 1 includes an eighteen pulse diode rectifier 48 to convert the AC grid 56 power into the DC bus power required for the NPC voltage source inverter. Low grid current distortion is important to avoid excessive harmonic distortion on the utility grid. The eighteen pulse series connection of three six pulse diode rectifier bridges 50 is most useful with a grid transformer 52 with three isolated sets of three phase transformer secondaries 54 with 20 degree phase separation between the three sets. Although eighteen pulse diode rectifiers are preferred, other diode rectifiers can alternatively be used.

One alternative embodiment (not shown), for example, capable of achieving the requisite IEEE-519 current distortion levels is a twenty four pulse configuration including four six pulse rectifiers in series fed from a grid transformer with secondary sets of 15 degree phase separation. This circuit has an advantage in that the split DC bus required for the NPC output converter stage can be achieved by feeding two series rectifier bridges into the upper half of the capacitor bank and the remaining two rectifier bridges into the lower half of the capacitor bank. This stiff independent power feed obviates the need for active control of neutral voltage balance. This option however increases number of diode components, increases the transformer complexity, and increases cabling costs.

Another alternative embodiment (not shown) is a twelve pulse configuration including two six pulse rectifier bridges. This embodiment includes less diode components and complexity at the expense of additional distortion.

The IEEE 519-1992 harmonic limits are a function of the ratio of line short circuit, Isc, to drive rated current, Ill. For ratios below twenty, the harmonic current limits expressed in terms of Total Demand Distortion (TDD) are given in Table 2. This measure differs from total harmonic distortion since harmonic content is measured relative to drive rated current. Overall current TDD must be less than five percent.

TABLE 2

IEEE-519-1992 Harmonic Current Limit Requirements

| Harmonic (h) Range | TDD Limit |
|---|---|
| 1 < h < 13 | 4% h odd–1% h even |
| 11 < h < 19 | 2% h odd–0.5% h even |
| 17 < h < 25 | 1.5% h odd–0.375% h even |
| 23 < h < 35 | 0.6% h odd–0.15% h even |
| Total Demand Distortion, all harmonics | $\{[Sum(I_h^2 - I_1^2)]^{1/2}/I_{ll}\}*100\% < 5\%$ |

In addition, due to special harmonic generation properties of eighteen pulse rectifiers, the TDD limits for eighteen pulse rectifiers for its characteristic harmonics can be increased by a factor of 1.73 provided the amplitudes of the non-characteristic harmonics are twenty five percent of the limits specified in the tables. IEEE 519-1992 also restricts the line voltage distortion. The total harmonic distortion (THD) with a maximum line impedance of five percent should not exceed five percent with each individual harmonic not exceeding three percent THD.

Figure 6:
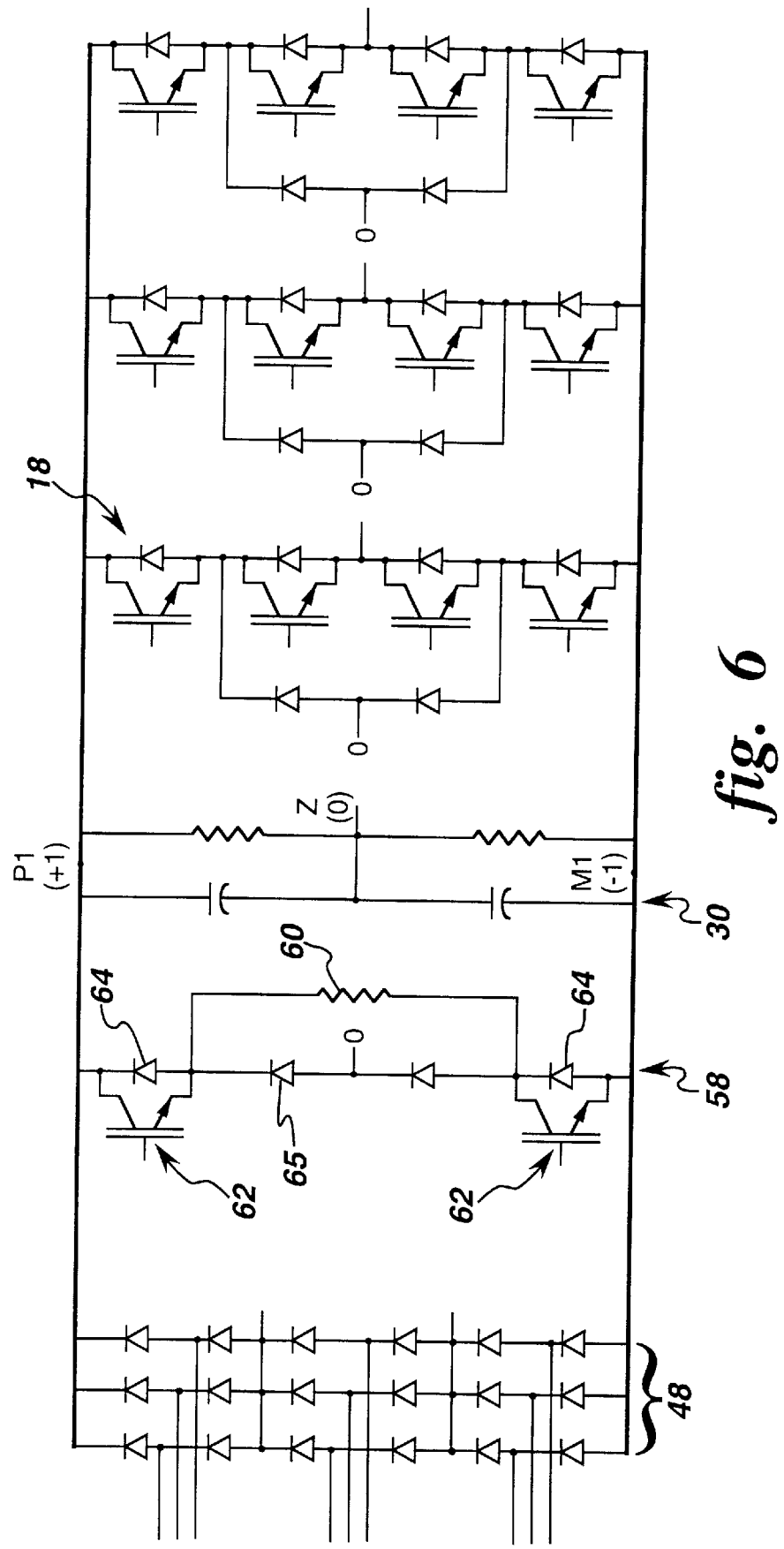
FIG. 6 is a circuit diagram of a dynamic braking (DB) circuit for a nonregenerative converter.

FIG. 6 is a circuit diagram of an optional dynamic braking (DB) circuit 58 for a non-regenerative converter. A DB resistor 60 is supplied to transiently dissipate energy stored in the rotating inertia which is regenerated into the DC bus during motor deceleration. DB switches 62 are gated in synchronism based on measured DC bus voltage (whenever the DC bus voltage rises to above the high line level). The controller should provide adequate hysteresis in order to both limit maximum bus voltage, DB switching frequency, and device switching losses. A freewheeling diode path 64 is supplied to accommodate inductive current paths to the DB resistor. A diode clamp path 65 to the DC bus neutral is supplied to allow for timing variances in the two DB switches.

FIG. 2 illustrates a full regenerative embodiment which will typically be used in high performance motor 74 drives or drives which must quickly decelerate high inertia loads. The power conversion stage 66 includes an NPC converter bridge similar to the NPC converter bridge 12. The embodiment of FIG. 2 is capable of arbitrary load power factors while providing a unity power factor interface to the grid.

The input 'rectifier' bridge 66 with three phase legs 68 serves as a PWM boost converter regulating the overall DC bus voltage. The input converter 66 interfaces to the utility grid 56 through an input stage filter assembly 70 which will filter the high frequency switching harmonics from the three phase converter current. An input stage transformer can be an integral part of the inductive elements in the grid filter. The DSP controller will regulate the three phase input current flow.

The power circuit should be supported by active DC neutral voltage balance control, and, in the present invention, the active control is supplied by a predictive charge calculation method. If the DC neutrals of the two converters are connected, then the charge balance of the combined split capacitor bank can be maintained by either of the two converters. The load side is generally to be preferred to free the source converter control for grid current regulation. Alternatively, the source and load converters can maintain separate neutrals with no common connection. In this case both modulation controls must independently maintain neutral charge balance.

Figure 7:
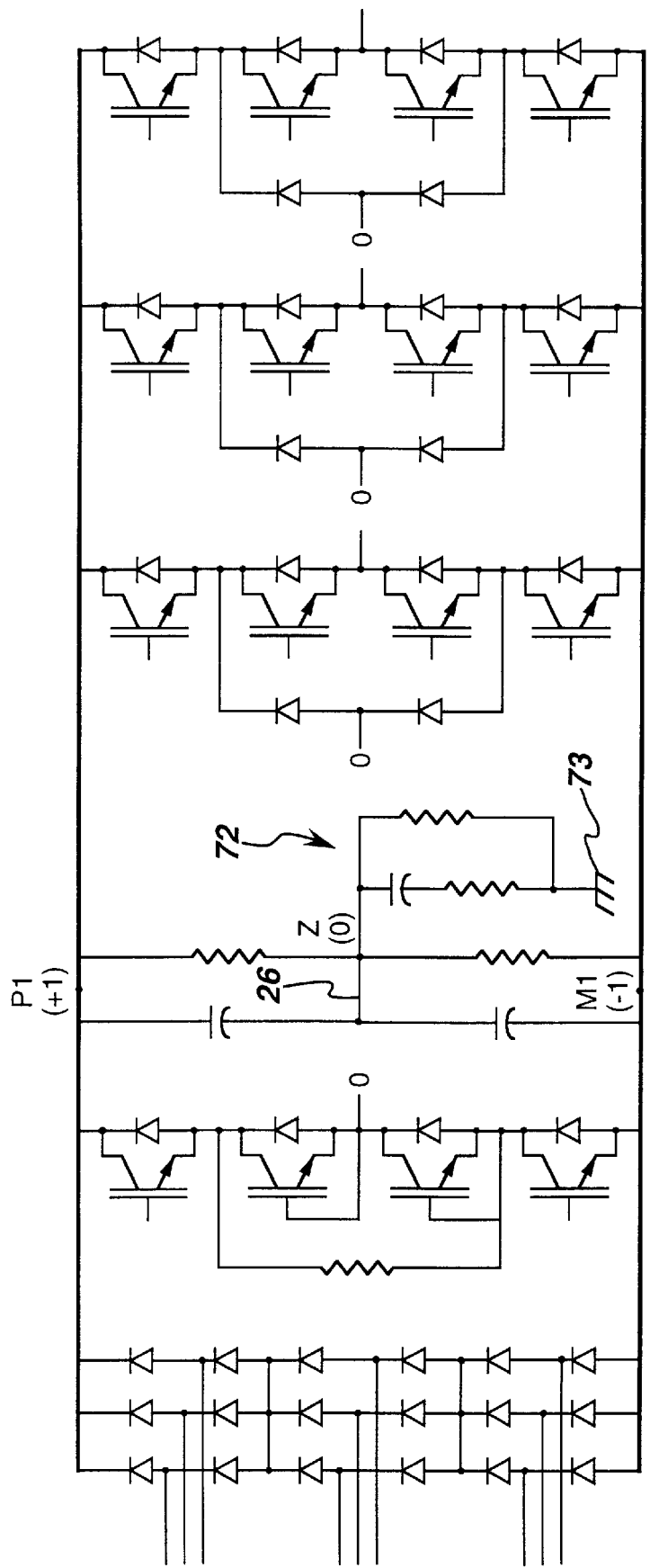
FIG. 7 is a circuit diagram of a ground reference network.

FIG. 7 is a circuit diagram of a ground reference network which is preferably coupled between the DC neutral point 26 and a ground frame 73. The ground reference network impedance is chosen to approximately match motor cable characteristic impedance. The voltage across the ground reference network is monitored by the controller for ground fault detection.

Preferably, a digital signal processor (DSP) based drive controller uses active neutral control by gate timing manipulation in order to maintain equal voltage balance on the split series capacitor bank (between the upper and lower halves of the DC link). It is desirable to also have tight control of the neutral charging currents in order to minimize the capacitance values required.

In one embodiment, the controller is an entirely software based system executed in a computer with interface circuits for voltage and current feedback data acquisition and digital timers for switch activations based on DSP computed timings. The DSP will include vector control of both machine torque and flux. The DSP will also include a space vector modulation control for the NPC converter bridge. Additionally, the DSP will include active DC bus neutral voltage control by gate timing manipulation in order to maintain equal voltage balance on the split series capacitor bank.

A modulator control algorithm of the present invention executes in the DSP controller by requiring only three additional hardware timers, one per phase, for actuation. The control algorithm is an extension of the space vector synthesis approach developed for two level inverters. Quick response to an arbitrary reference voltage vector is ensured by an immediate warp transition between home vertices followed by adjacent vector modulation. Neutral voltage control is achieved by choosing amongst alternative vectors based on measured voltage error and predicted charge using either measured or reference phase currents. The predicted charge method ensures maximum neutral corrective effort regardless of load power factor.

Figure 8:
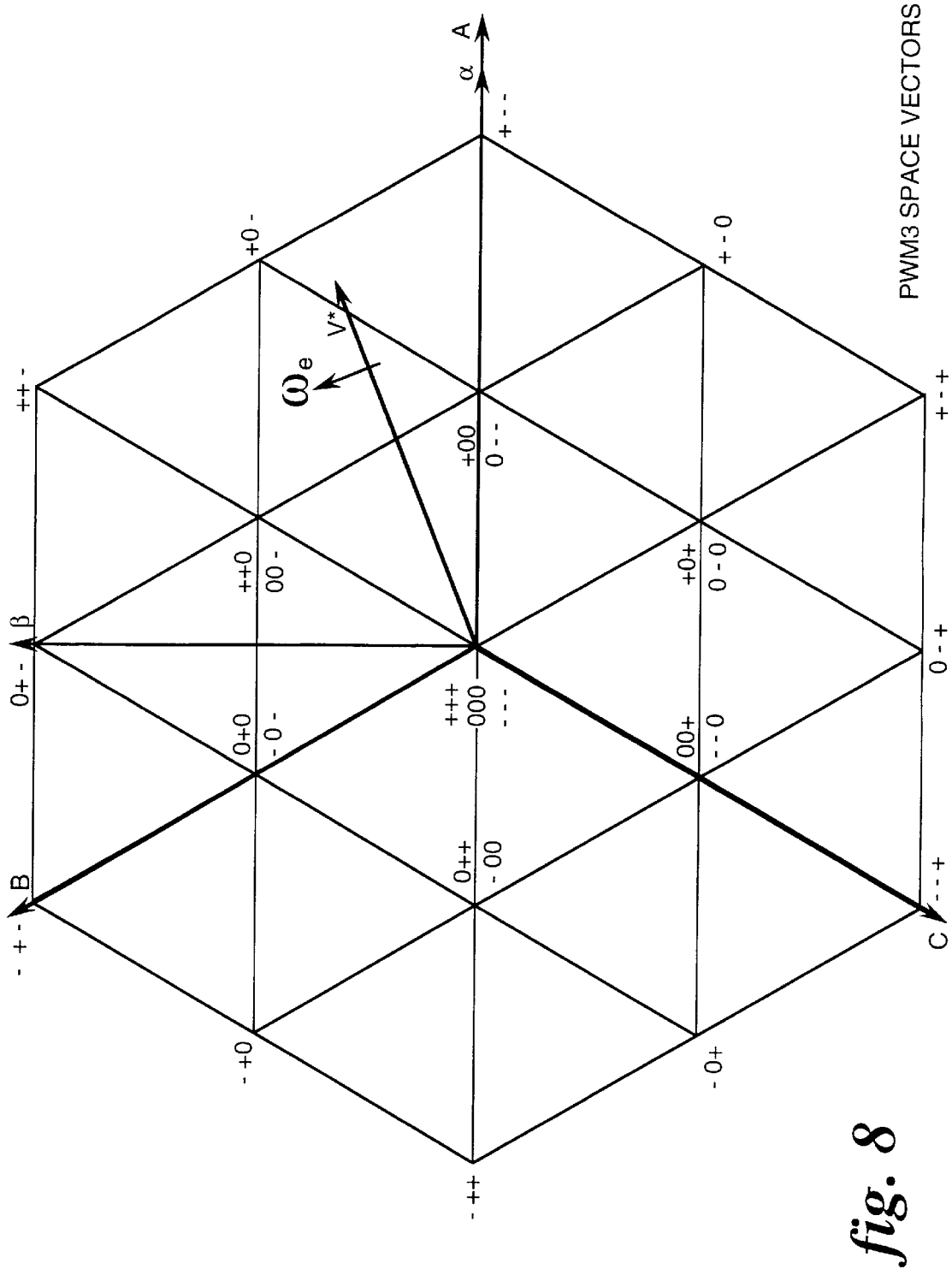
FIG. 8 is a diagram of three level pulse width modulation (PWM3) space vectors.

FIG. 8 is a diagram of three level pulse width modulated (PWM3) space vectors illustrating the complex voltage plane defined by the orthogonal α, β voltage axes and indicating the direction of phase voltages A, B, C. The a and A phase axes align with the peak of the phase A voltage wave. The hexagonal outer boundary indicates the reachable voltages defined by the magnitude of the DC bus voltage (Vdc). The vertices of the individual triangular regions are denoted by a three digit gating state, one digit per phase, in ABC order. Each digit can assume a –, 0, or + value representing the three voltage levels available in an inverter phase leg. The reference voltage vector V* is denoted rotating at frequency $w_e$ in a counter clockwise direction. For smooth voltage synthesis during steady state conditions the reference voltage vector will sweep through adjoining triangular regions at a sinusoidal frequency and a substantially constant magnitude. Space vector synthesis will create the desired voltage by time modulating between the three corner vertices of the triangular region containing the reference voltage vector tip.

Figure 9:
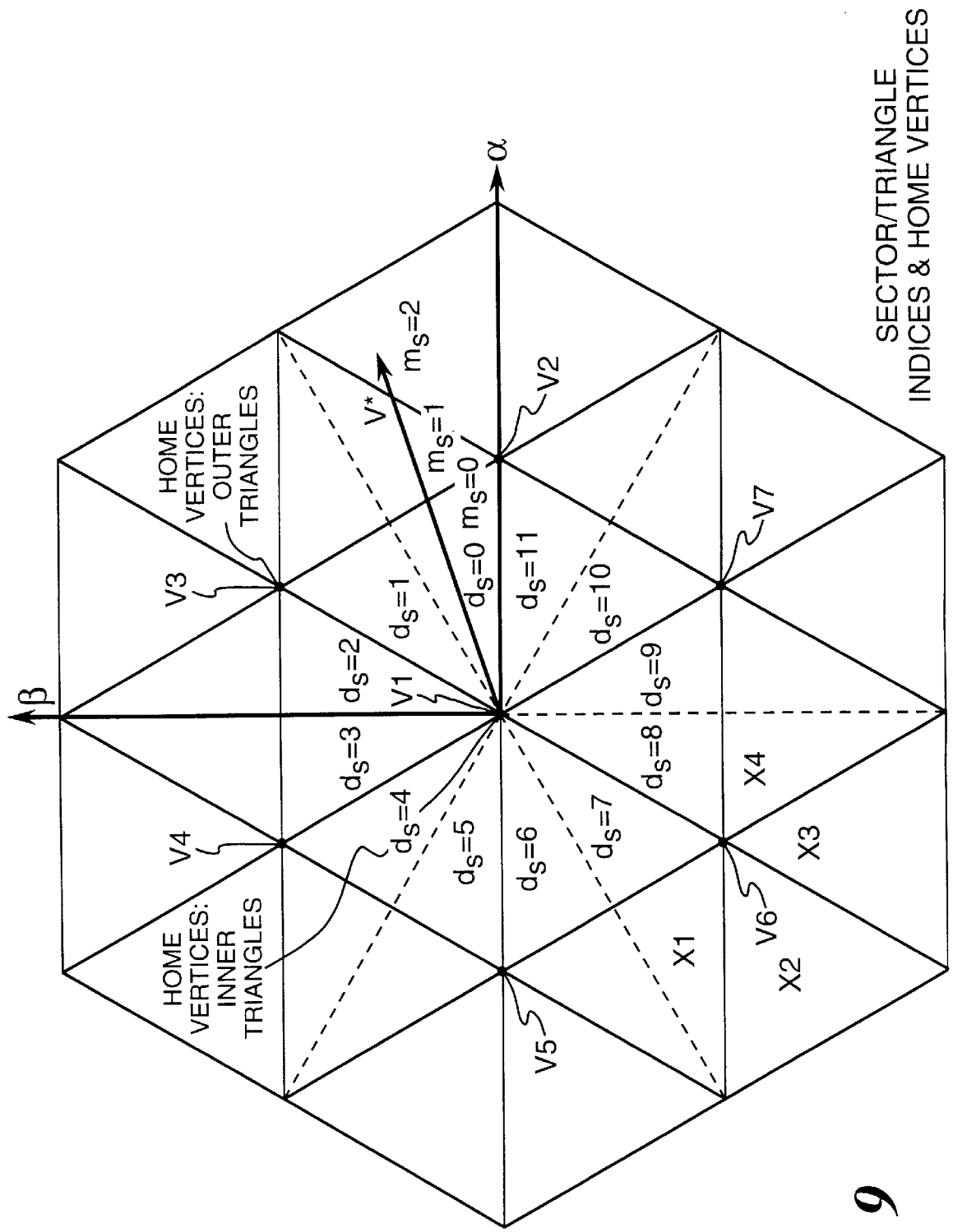
FIG. 9 is a diagram of sector/triangle indices and home vertices.

FIG. 9 is a diagram of sector/triangle indices and home vertices illustrating the modulator control segmenting the complex voltage plane. Twelve sectors, 30 degrees in arc, are defined (ds=0–11). Each 30 degree sector is further subdivided by magnitude into three triangular zones (ms= 0–2). The reference voltage vector is assigned a ds index according to the reference angle to the a axis and an ms index based on reference amplitude. The combination of ds and ms indices defines one of 36 triangular zones within the reachable voltage hexagon. Once the correct triangular zone has been located, a home vertex position is defined per FIG. 9 as a vertex in common with one of the triangle corners and in a position closest to the center of the diagram. There are 7 home vertices: one (+++/000/---) for all the twelve inner triangular zones (ms=0 & ds=0–11) and six (+00/0--, ++0/00-, 0+0/-0-, 0++/-00, 00+/-0, +0+/0-0) for the 24 outer triangular zones (ms=1 or 2). For example, if a reference voltage vector were in a triangular zone X1–X4, the home vertex would be v6. Each modulation vector sequence always begins and ends on a home vertex. The redundant choices in voltage vertices enables simultaneous voltage synthesis and charge balance as explained below.

Figure 10:
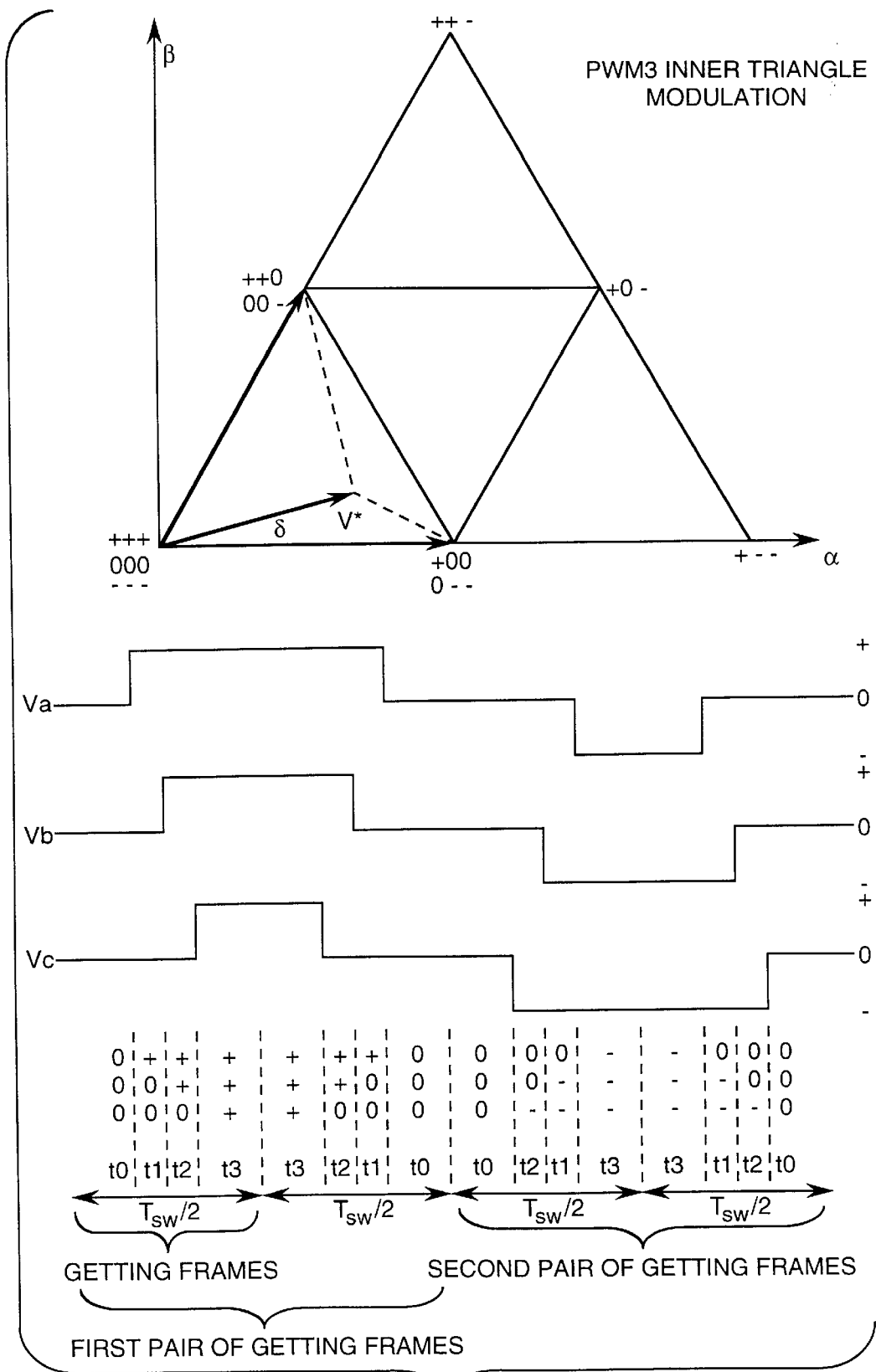
FIG. 10 is a set of graphs illustrating PWM3 inner triangle modulation.

FIG. 10 is a set of graphs illustrating PWM3 inner triangle modulation. The reference voltage vector sequence begins at the home vertex 000. For each gating frame (or period), the switching pattern proceeds to the corner vertices defining the triangular region, switching one phase at a time (000 to +00 to ++0 to +++) with one transition defined per phase, ending at the home vertex +++. The DSP computes the relative dwell times at each corner vertex in order to achieve the desired reference voltage vector, on the average, over the gating frame. The following calculation solves a set of simultaneous linear equations to compute the dwell times t03, t1, and t2 with the zero vector dwell time (t03) further subdivded equally into t0 (000 dwell time) and t3 (+++ dwell time):

$$m = \frac{3 \cdot |V^*|}{2 \cdot V_{dc}}, \; m\cos d = m \cdot \cos(\delta), \; m\sin d = m \cdot \sin(\delta),$$

$$\begin{bmatrix} m\cos d \\ m\sin d \\ 1 \end{bmatrix} = \begin{bmatrix} \frac{1}{2} & \frac{1}{2} \cdot \cos\frac{\pi}{3} & 0 \\ 0 & \frac{1}{2} \cdot \sin\frac{\pi}{3} & 0 \\ 1 & 1 & 1 \end{bmatrix} \begin{bmatrix} k1 \\ k2 \\ k03 \end{bmatrix},$$

$$t1 = k1 \cdot dtpwm, \; t2 = k2 \cdot dtpwm, \; t03 = k03 \cdot dtpwm,$$

wherein d is the angle from the reference voltage vector to the closest axis, dtpwm is the gating interval time, V* is the reference voltage vector, $V_{dc}$ is the measured voltage, δ is an angle of the reference voltage vector with respect to a side of the triangular zone in which the reference voltage vector is present, k03 is the per unit dwell time at the home vertex, k1 is the per unit dwell time at the first corner vertex, and k2 is the per unit dwell time at the second corner vertex. The DSP outputs gating times and gating states for each phase; e.g. for this sequence t0 for A, t0+t1 for B, t0+t1+t2 for C. The timers are synchronously activated every gating period.

After each gating frame, at the next sampling instant, in a preferred embodiment the appropriate next switching pattern is determined. If the reference voltage vector is in the same triangular zone as in the previous gating frame, a second gating frame traverses the vertices in the opposite sequence (+++ to ++0 to +00 to 000) from the first gating frame. The described switching pattern uses only the 0 and + gating states for each phase. This has the effect of discharging the upper half capacitor bank when motoring. The first and second gating frames form a gating frame pair.

To continue to maintain charge balance on the capacitor halves, if the reference voltage vector remains in the same triangular zone the sequence of first and second gating frames can alternate with a minus gating state sequence as in the second pair of gating frames illustrated by FIG. 10 (000 to 00- to 0-- to --- followed by --- to 0-- to 00- to 000).

Depending on the modulation algorithm, after the completion of (1) each gating frame, (2) each pair of gating frames, or (3) two pairs of gating frames, at the sampling instant prior to the beginning of the next gating frame, whether or not the reference voltage vector remains in the same triangular zone, alternative gating sequences are possible: a positive sequence 000 to +++, a negative sequence 000 to ---, or, for option (1) where the test is performed after each gating frame, one of the opposite sequences discussed above (+++ to 000 or --- to 000).

To actively control neutral charge balance for inner triangle modulation, the net charge injected into the DC bus neutral is computed for available alternatives as the sum of the product of the phase current ($i_k$) and the neutral dwell time ($dt_{nk}$) for each phase q=$\Sigma_{k=1..3}$ ($i_k * \delta t_{nk}$). The alternative is chosen, based on the polarity of the predicted neutral charge, to correct for any measured neutral voltage error. If the neutral voltage error is small (i.e. within a small deadband) positive and negative gating sequences will alternate. If the reference voltage vector changes triangles, then the home vertex will switch to be the home vertex of the new triangular zone in which the reference voltage vector is situated.

Figure 11:
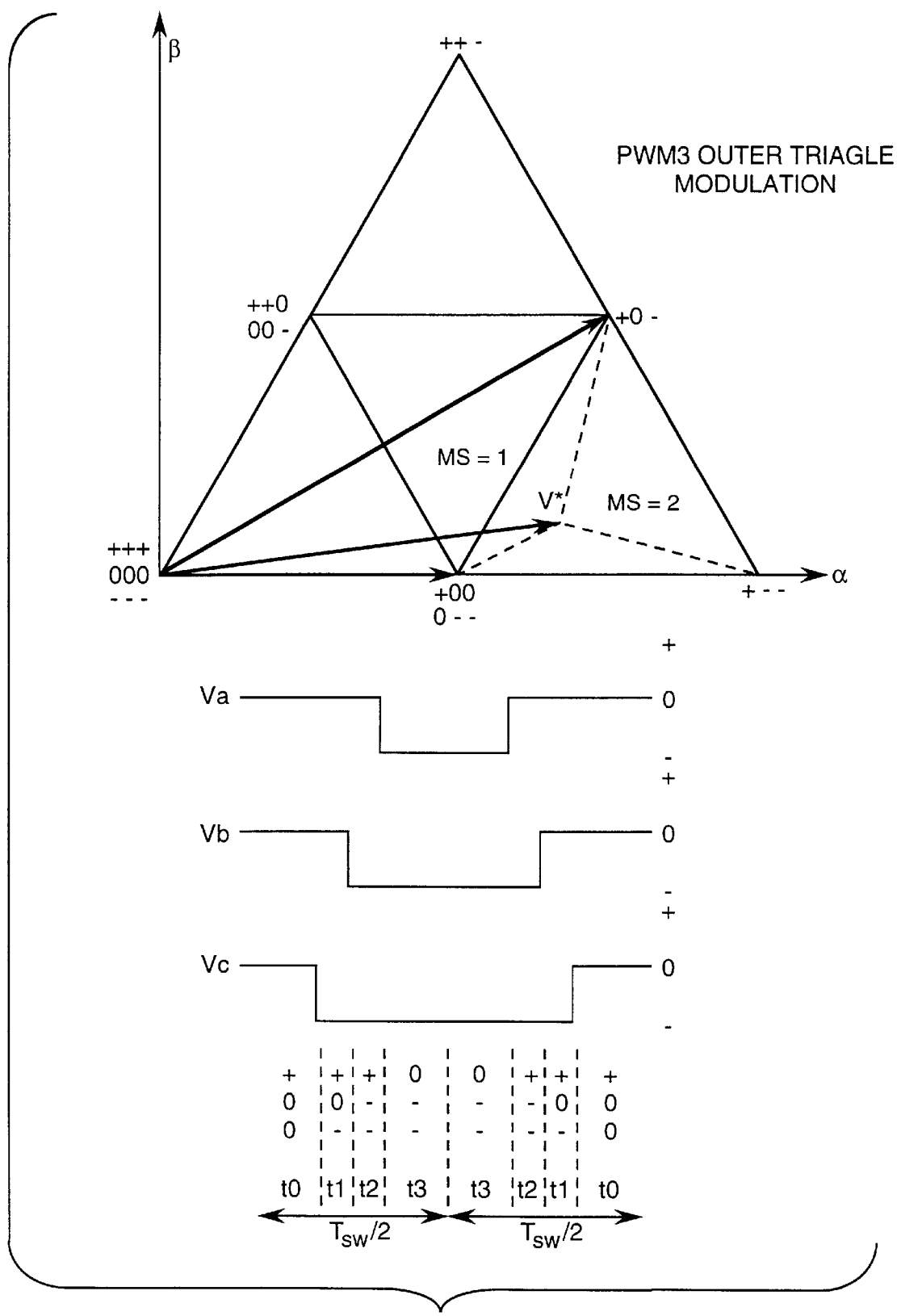
FIG. 11 is a set of graphs illustrating PWM3 outer triangle modulation.

FIG. 11 is a set of graphs illustrating PWM3 outer triangle modulation, i.e., when the reference voltage vector magnitude is greater than ½ maximum. The modulation sequence starts at the home vertex (gstate=+00) and proceeds switching one phase at a time from +00 to +0- to +-- returning to the home vertex (gstat=0--). The dwell times at each triangle vertex (t03, t1, and t2) are again computed by solving a set of simultaneous linear equations for ms=1:

$$\begin{bmatrix} m\cos d \\ m\sin d \\ 1 \end{bmatrix} = \begin{bmatrix} \cos\frac{\pi}{6} \cdot \cos\frac{\pi}{6} & \frac{1}{2} \cdot \cos\frac{\pi}{3} & \frac{1}{2} \\ \cos\frac{\pi}{6} \cdot \sin\frac{\pi}{6} & \frac{1}{2} \cdot \sin\frac{\pi}{3} & 0 \\ 1 & 1 & 1 \end{bmatrix} \begin{bmatrix} k1 \\ k2 \\ k03 \end{bmatrix},$$

or for ms=2:

$$\begin{bmatrix} m\cos d \\ m\sin d \\ 1 \end{bmatrix} = \begin{bmatrix} 1 & \cos\frac{\pi}{6} \cdot \cos\frac{\pi}{6} & \frac{1}{2} \\ 0 & \cos\frac{\pi}{6} \cdot \sin\frac{\pi}{6} & 0 \\ 1 & 1 & 1 \end{bmatrix} \begin{bmatrix} k1 \\ k2 \\ k03 \end{bmatrix}.$$

If no neutral correction is required, the home vertex dwell time is subdivided equally into t0 (+00 dwell time) and t3 (0--dwell time). The second half gating frame reverses the gating sequence 0-- to +-- to +0- to +00. Actual gating actuation is again controlled by per-phase synchronously activated timers.

Neutral voltage control for outer triangle modulation is achieved by adjusting relative dwell times for the redundant gating states of the home vertex (t0 vs. t3 time) while keeping their sum fixed. The relative charge injection for the two alternatives is again computed as the sum of the product of phase current ($i_k$) and neutral dwell time ($dt_{nk}$) for each phase. The two alternatives will have equal and opposite effect. Either t0 or t3 will be maximized, based on the polarity of the predicted neutral charge, to correct for any measured neutral voltage error. The dwell times are assigned to maximize the corrective action i.e. assigning t=t03−tminz to the selected alternative and tminz to the other, where tminz is a minimum pulse width time. The maximum corrective action corresponds to a bang-bang control strategy. A linear controller with proportional correction can also be implemented. Optionally, if the neutral voltage error is small (i.e. within a small deadband) the t0 and t3 times can be set equally without applying a corrective effort.

Figure 12:
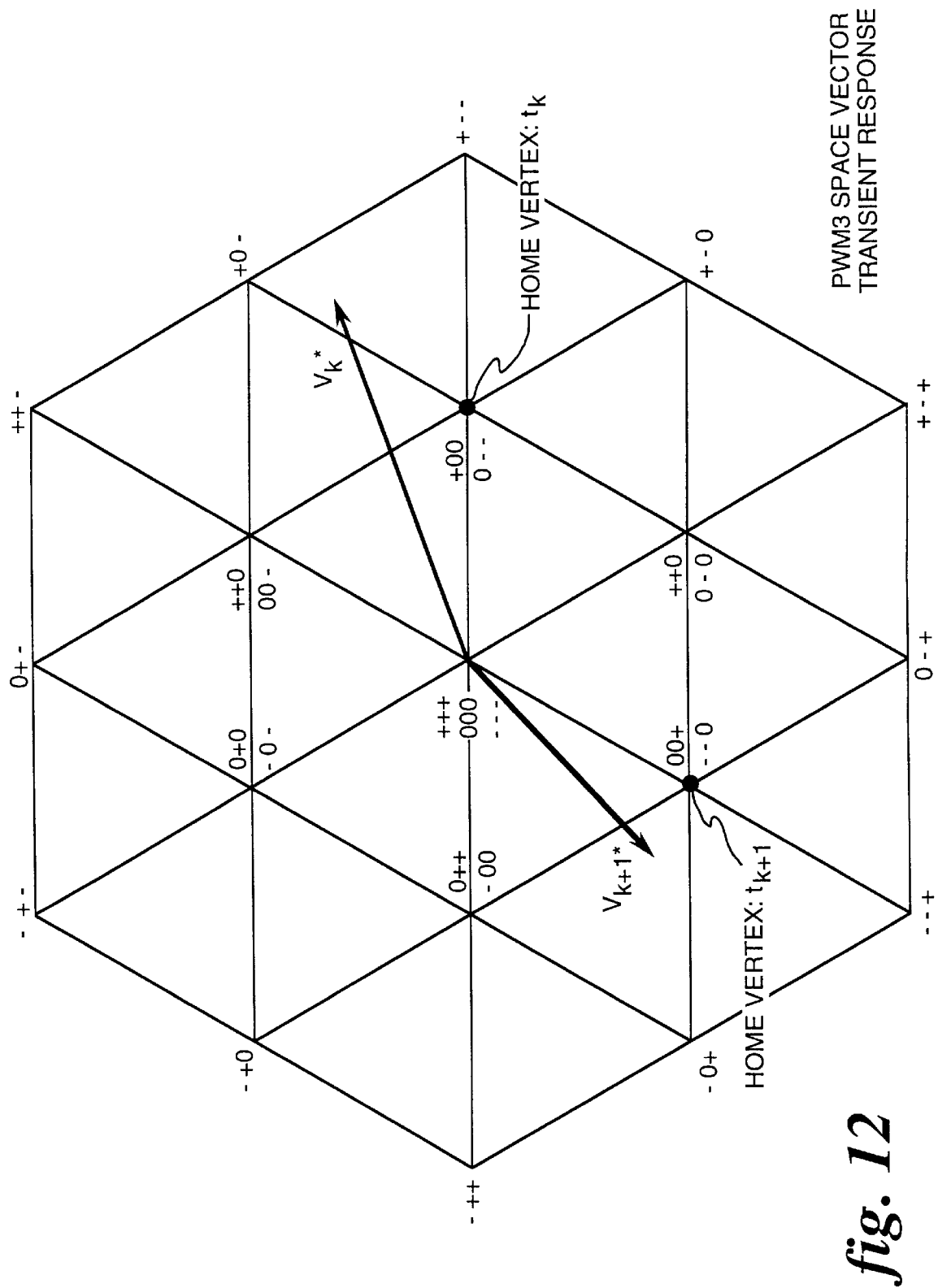
FIG. 12 is a diagram of PWM3 space vector transient response.

FIG. 12 is a diagram of PWM3 space vector transient illustrating the warp transition mode which facilitates rapid transient response for vector controlled drives.

Two successive reference voltage vectors are shown $V_k^*$ and $V_{k+1}^*$. The algorithm will force a synchronous transition from the old home vertex (time $t_k$) to the new home vertex (time $t_{k+1}$). Each home vertex gating state is assigned a polarity weight index ranging between −3 through +3 (e.g. gstate=+00 has a weight of +1). The warp transition chooses the gating state of the new home vertex to minimize the change in the polarity weight index. After transitioning to the new home vertex, a conventional outer triangle modulation sequence is computed for the next half gating frame. In this manner there is no delay introduced in synthesizing the next reference voltage vector. The same algorithm is also applied to transitions within the inner triangles and between inner and outer triangles.

Overmodulation (non-linear production of high output voltages) is possible with this control system. Overmodulation can be achieved by pulse dropping and/or shifting the reference voltage vector angle towards the closest axis, thereby reaching the reference voltage vector magnitude while still respecting the minimum pulse width constraint.

While only certain preferred features of the invention have been illustrated and described herein, many modifications and changes will occur to those skilled in the art. It is, therefore, to be understood that the appended claims are intended to cover all such modifications and changes as fall within the true spirit of the invention.

We claim:

1. A high power motor drive converter comprising:
    a three level neutral point clamped (NPC) output power conversion stage including switches for supplying power to an AC drive motor;
    a split series connected DC capacitor bank coupled in parallel with the NPC output power conversion stage;
    a controller for selecting switch positions for controlling the NPC output power conversion stage and controlling a neutral voltage balance of the DC capacitor bank by using space vector modulation and predictive charge calculations;
    an input power conversion stage coupled in parallel to the capacitor bank.

2. The converter of claim 1 wherein the input power conversion stage comprises a non-regenerative diode rectifier input power conversion stage or a regenerative three level NPC pulse width modulating input power conversion stage.

3. The converter of claim 1 wherein the input power conversion stage comprises a non-regenerative eighteen pulse diode rectifier input power conversion stage and the converter further comprises a dynamic braking circuit coupled in parallel with the capacitor bank.

4. The converter of claim 2 wherein the input power conversion stage comprises the regenerative three level PC pulse width modulating input power conversion stage and wherein neutral points of the NPC pulse width modulating output power conversion stage and the NPC pulse width modulating input power conversion stage are electrically coupled.

5. The converter of claim 2 further including a plurality of snubber circuits, each snubber circuit coupled to a respective one of the switches.

6. The converter of claim 2 further including a neutral-ground reference network tuned to provide camping for reflected wavefronts propagating on the motor cables.

7. The converter of claim 2 wherein the controller is adapted to use the space vector modulation to control a magnitude and a rotation of a reference voltage vector in a complex voltage plane defined by orthogonal axes and phase voltages.

8. The converter of claim 7 wherein the complex voltage plane is divided into twelve thirty degree sectors based on a reference angle of the reference voltage vector with each thirty degree sector being subdivided into three triangular zones based on the reference angle and the magnitude of the reference voltage vector, wherein a total of thirty six triangular zones are present with twelve triangular zones representing reference voltage vectors having magnitudes less than or equal to one half of a maximum magnitude and having a central home vertex and twenty-four triangular zones on an outer perimeter of the twelve triangular zones, the twenty four triangular zones representing reference voltage vectors having magnitudes greater than or equal to one half of the maximum magnitude and having six outer home vertices.

9. The converter of claim 8 wherein the controller is adapted to create a reference voltage vector switching pattern which begins and ends on a selected home vertex of the central and outer home vertices corresponding to a respective position of the reference voltage vector,
    the switching pattern proceeding during a gating period from the selected home vertex to corner vertices defining a triangular zone in which the reference voltage vector is present while selecting the relative dwell times at each corner vertex to achieve the desired reference voltage vector over the gating period.

10. The converter of claim 9 wherein the gating period comprises a first gating period and wherein the controller is adapted to create a second gating period with the switching pattern proceeding to the corner vertices in an opposite direction than the first gating period.

11. The converter of claim 9 wherein, if the magnitude of the reference voltage vector is less than one half of the maximum magnitude, the following set of simultaneous linear equations are used to compute the dwell times at the corner vertices:

$$m = \frac{3 \cdot |V^*|}{2 \cdot V_{dc}}, \; m\cos d = m \cdot \cos(\delta), \; m\sin d = m \cdot \sin(\delta), \qquad (1)$$

-continued $$\begin{bmatrix} m\cos d \\ m\sin d \\ 1 \end{bmatrix} = \begin{bmatrix} \frac{1}{2} & \frac{1}{2} \cdot \cos\frac{\pi}{3} & 0 \\ 0 & \frac{1}{2} \cdot \sin\frac{\pi}{3} & 0 \\ 1 & 1 & 1 \end{bmatrix} \begin{bmatrix} k1 \\ k2 \\ k03 \end{bmatrix}, \quad (2)$$

$$t1 = k1 \cdot dtpwm, \; t2 = k2 \cdot dtpwm, \; t03 = k03 \cdot dtpwm, \quad (3)$$

wherein
- d=the angle from the reference voltage vector to the closest axis
- dtpwm=the gating period time
- V*=the reference voltage vector
- $V_{dc}$=the measured voltage
- δ=an angle of the reference voltage vector with respect to a side of the triangular zone in which the reference voltage vector is present
- k03=the per unit dwell time at the home vertex
- k1=the per unit dwell time at a first corner vertex
- k2=the per unit dwell time at a second corner vertex
- t03=the dwell time at the home vertex
- t1=the dwell time at the first corner vertex
- t2=the dwell time at the second corner vertex.

12. The converter of claim 11 wherein the controller is adapted to, after the completion of a gating period, determine whether to begin a positive or a negative gating sequence by predicting a net charge that would be injected into a neutral point for each alternative sequence as a sum of a product of a phase current and the neutral dwell time for each phase and selecting the gating sequence based on polarities of the predicted net charges to correct for any differences between the reference voltage vector and a measured voltage.

13. The converter of claim 11 wherein, if the magnitude of the reference voltage vector is greater than or equal to one half of the maximum magnitude, then
if the triangular zone has a side adjacent to a side of one of the twelve triangular zones, equations (1–3) of claim 10 are applied with equation (2) being replaced with the following equation:

$$\begin{bmatrix} m\cos d \\ m\sin d \\ 1 \end{bmatrix} = \begin{bmatrix} \cos\frac{\pi}{6} \cdot \cos\frac{\pi}{6} & \frac{1}{2} \cdot \cos\frac{\pi}{3} & \frac{1}{2} \\ \cos\frac{\pi}{6} \cdot \sin\frac{\pi}{6} & \frac{1}{2} \cdot \sin\frac{\pi}{3} & 0 \\ 1 & 1 & 1 \end{bmatrix} \begin{bmatrix} k1 \\ k2 \\ k03 \end{bmatrix},$$

or, if the triangular zone does not have a side adjacent to a side of one of the twelve triangular zones, equations (1–3) of claim 10 are applied with equation (2) being replaced with the following equation:

$$\begin{bmatrix} m\cos d \\ m\sin d \\ 1 \end{bmatrix} = \begin{bmatrix} 1 & \cos\frac{\pi}{6} \cdot \cos\frac{\pi}{6} & \frac{1}{2} \\ 0 & \cos\frac{\pi}{6} \cdot \sin\frac{\pi}{6} & 0 \\ 1 & 1 & 1 \end{bmatrix} \begin{bmatrix} k1 \\ k2 \\ k03 \end{bmatrix}.$$

14. The converter of claim 13 wherein the converter is adapted to adjust dwell times of redundant gating states of a home vertex based on the polarity of the predicted neutral change while keeping a sum of the dwell times of the redundant gating states fixed.

15. The converter of claim 9 wherein each of the home vertices has a respective gating state with an assigned polarity weight index and the controller is adapted to respond to transient conditions by choosing a gating state of a new home vertex to minimize the change in the polarity weight index between a present home vertex and the new home vertex.

16. A method of controlling a high power motor drive converter including a three level neutral point clamped (NPC) output power conversion stage including switches for supplying power to an AC drive motor, a split series connected DC capacitor bank coupled in parallel with the NPC output power conversion stage, the method comprising:
selecting switch positions for controlling the NPC output power conversion stage and controlling a neutral voltage balance of the DC capacitor bank by using space vector modulation to control a magnitude and a rotation of a reference voltage vector in a complex voltage plane defined by orthogonal axes and phase voltages.

17. The method of claim 16 further including dividing the voltage plane into twelve thirty degree sectors based on a reference angle of the reference voltage vector and subdividing each thirty degree sector into three triangular zones based on the reference angle and the magnitude of the reference voltage vector, wherein a total of thirty six triangular zones are present with twelve triangular zones representing reference voltage vectors having magnitudes less than or equal to one half of a maximum magnitude and having a central home vertex and twenty-four triangular zones on an outer perimeter of the twelve triangular zones, the twenty four triangular zones representing reference voltage vectors having magnitudes greater than or equal to one half of the maximum magnitude and having six outer home vertices.

18. The method of claim 17 further comprising creating a reference voltage vector switching pattern which begins and ends on a selected home vertex of the central and outer home vertices corresponding to a respective position of the reference voltage vector,
the switching pattern proceeding during a gating period from the selected home vertex to corner vertices defining a triangular zone in which the reference voltage vector is present while selecting the relative dwell times at each corner vertex to achieve the desired reference voltage vector over the gating period.

19. The method of claim 18 wherein the gating period comprises a first gating period and further including creating a second gating period with the switching pattern proceeding to the corner vertices in an opposite direction than the first gating period.

20. The method of claim 18 wherein, if the magnitude of the reference voltage vector is less than one half of the maximum magnitude, the following set of simultaneous linear equations are used to compute the dwell times at the corner vertices:

$$m = \frac{3 \cdot |V^*|}{2 \cdot V_{dc}}, \; m\cos d = m \cdot \cos(\delta), \; m\sin d = m \cdot \sin(\delta), \quad (1)$$

-continued $$\begin{bmatrix} m\cos d \\ m\sin d \\ 1 \end{bmatrix} = \begin{bmatrix} \frac{1}{2} & \frac{1}{2}\cdot\cos\frac{\pi}{3} & 0 \\ 0 & \frac{1}{2}\cdot\sin\frac{\pi}{3} & 0 \\ 1 & 1 & 1 \end{bmatrix} \begin{bmatrix} k1 \\ k2 \\ k03 \end{bmatrix}, \quad (2)$$

$$t1 = k1 \cdot dtpwm,\ t2 = k2 \cdot dtpwm,\ t03 = k03 \cdot dtpwm, \quad (3)$$

wherein
- d=the angle from the reference voltage vector to the closest axis
- dtpwm=the gating period time
- V*=the reference voltage vector
- $V_{dc}$=the measured voltage
- δ=an angle of the reference voltage vector with respect to a side of the triangular zone in which the reference voltage vector is present
- k03=the per unit dwell time at the home vertex
- k1=the per unit dwell time at a first corner vertex
- k2=the per unit dwell time at a second corner vertex
- t03=the dwell time at the home vertex
- t1=the dwell time at the first corner vertex
- t2=the dwell time at the second corner vertex.

21. The method of claim 20 further including, after the completion of a gating period, determining whether to begin a positive or a negative gating sequence by predicting a net charge that would be injected into a neutral point for each alternative sequence as a sum of a product of a phase current and the neutral dwell time for each phase and selecting the gating sequence based on polarities of the predicted net charges to correct for any differences between the reference voltage vector and a measured voltage.

22. The method of claim 20 wherein, if the magnitude of the reference voltage vector is greater than or equal to one half of the maximum magnitude, then if the triangular zone has a side adjacent to a side of one of the twelve triangular zones, equations (1–3) of claim 10 are applied with equation (2) being replaced with the following equation:

$$\begin{bmatrix} m\cos d \\ m\sin d \\ 1 \end{bmatrix} = \begin{bmatrix} \cos\frac{\pi}{6}\cdot\cos\frac{\pi}{6} & \frac{1}{2}\cdot\cos\frac{\pi}{3} & \frac{1}{2} \\ \cos\frac{\pi}{6}\cdot\sin\frac{\pi}{6} & \frac{1}{2}\cdot\sin\frac{\pi}{3} & 0 \\ 1 & 1 & 1 \end{bmatrix} \begin{bmatrix} k1 \\ k2 \\ k03 \end{bmatrix},$$

or, if the triangular zone does not have a side adjacent to a side of one of the twelve triangular zones, equations (1–3) of claim 10 are applied with equation (2) being replaced with the following equation:

$$\begin{bmatrix} m\cos d \\ m\sin d \\ 1 \end{bmatrix} = \begin{bmatrix} 1 & \cos\frac{\pi}{6}\cdot\cos\frac{\pi}{6} & \frac{1}{2} \\ 0 & \cos\frac{\pi}{6}\cdot\sin\frac{\pi}{6} & 0 \\ 1 & 1 & 1 \end{bmatrix} \begin{bmatrix} k1 \\ k2 \\ k03 \end{bmatrix}.$$

23. The method of claim 17 wherein each of the home vertices has a respective gating state with an assigned polarity weight index and the controller is adapted to respond to transient conditions by choosing a gating state of a new home vertex to minimize the change in the polarity weight index between a present home vertex and the new home vertex.

* * * * *